United States Patent
Mori et al.

(10) Patent No.: US 6,445,090 B1
(45) Date of Patent: Sep. 3, 2002

(54) ELECTRICAL EQUIPMENT HAVING ENERGY SAVING MODE CAPABLE OF SHUTTING OFF SUPPLYING OF VOLTAGE TO PRIMARY POWER SUPPLY SUPPLYING CIRCUIT UNDER NO USE THEREOF

(75) Inventors: Toshiharu Mori; Yoshio Tanabe, both of Miyagi-ken; Kaoru Soeta, Kanagawa-ken; Yoshimi Goto, Miyagi-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/453,275

(22) Filed: Dec. 2, 1999

(30) Foreign Application Priority Data

Dec. 9, 1998 (JP) .......................................... 10-349555

(51) Int. Cl.⁷ .............................................. H01H 47/00
(52) U.S. Cl. ...................... 307/119; 200/524; 307/125; 307/139
(58) Field of Search ........................... 307/66, 112, 116, 307/125, 119, 139, 140; 335/6, 14, 20, 63; 399/33, 88; 200/524, 324, 520, 523, 323

(56) References Cited

U.S. PATENT DOCUMENTS

| | | | | |
|---|---|---|---|---|
| 4,436,408 A | * | 3/1984 | Inuzuka et al. | 399/33 |
| 4,543,459 A | * | 9/1985 | Hayashida | 200/524 |
| 5,041,805 A | * | 8/1991 | Ohishi et al. | 335/14 |
| 5,223,810 A | * | 6/1993 | Van Haaren | 335/18 |
| 5,262,606 A | * | 11/1993 | Benson et al. | 200/523 |
| 5,624,023 A | * | 4/1997 | Chasen et al. | 200/523 |
| 5,841,085 A | * | 11/1998 | Rittinghaus et al. | 200/524 |
| 5,886,603 A | * | 3/1999 | Powell | 335/21 |
| 6,207,914 B1 | * | 3/2001 | Mori | 200/524 |
| 6,291,910 B1 | * | 9/2001 | Mori et al. | 307/125 |
| 6,304,008 B1 | * | 10/2001 | Goto et al. | 307/125 |

FOREIGN PATENT DOCUMENTS

JP 6-349139 12/1994

* cited by examiner

Primary Examiner—Brian Sircus
Assistant Examiner—Roberto J. Rios
(74) Attorney, Agent, or Firm—Brinks Hofer Gilson & Lione

(57) ABSTRACT

The electrical equipment of the present invention is operated such that the ON operating member for the primary power supply supplying circuit is manually operated, the switch device S is turned ON and when a supplying of electrical power for the primary power supply supplying circuit is shut off, the circuit for the control system is operated and upon performing a predetermined security processing, the driving source is driven, the OFF operating member is automatically operated, the switch device S is automatically turned OFF and supplying of an electrical power to the primary power supply supplying circuit is automatically shut off, so that it is possible to perform an appropriate processing before shutting off the primary power supply supplying circuit and thus it is also possible to provide electrical equipment showing a high safety characteristic.

5 Claims, 9 Drawing Sheets

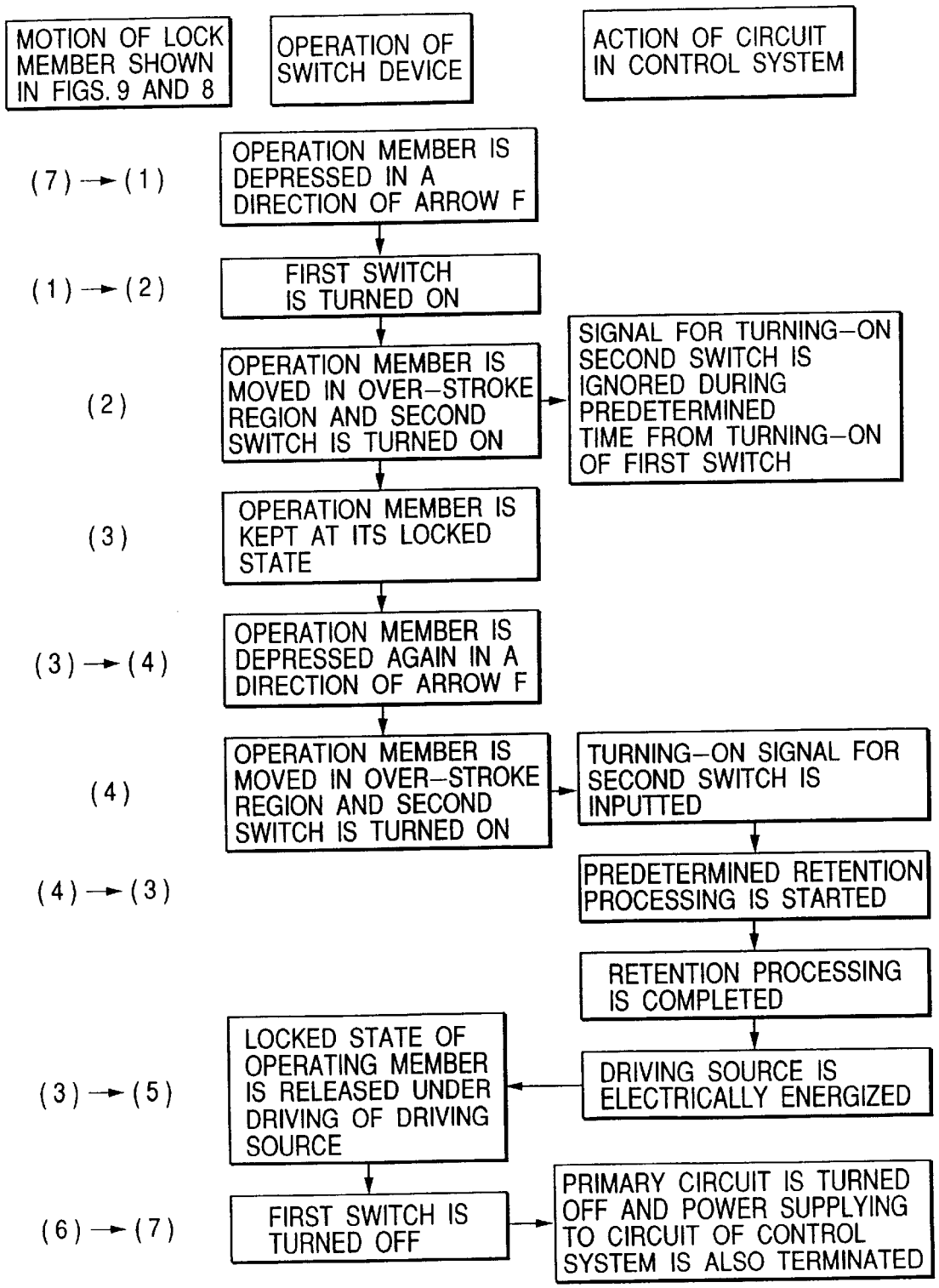

ELECTRICAL EQUIPMENT HAVING
ENERGY SAVING MODE CAPABLE OF
SHUTTING OFF SUPPLYING OF VOLTAGE
TO PRIMARY POWER SUPPLY SUPPLYING
CIRCUIT UNDER NO USE THEREOF

BACKGROUND OF THE INVENTION

1. Field of the Invention

This invention relates to electrical equipment such as a television, VTR, a printer or a fan heater and the like, and more particularly, electrical equipment having an energy saving mode capable of shutting off of a supplying of a power supply voltage to the primary power supply supplying circuit under no use thereof.

2. Description of the Related Art

Referring now to a fan heater, for example, the prior art electrical equipment, has a timer function connected to a power supply circuit, wherein due to a necessity for performing a combustion at a fan heater at a specified time even when the timer function is energized and the power supply is turned OFF, the primary power supply supplying circuit is always kept ON, consequently, a state in which a part of the secondary power supply supplying circuit is connected to the primary power supply supplying circuit is continued to be kept ON.

Accordingly, in the case of the prior art fan heater, an electrical power is always supplied to the primary power supply supplying circuit even under a state in which the secondary power supply supplying circuit has been turned OFF. Accordingly, so that a waiting electrical power of about several Watts was always consumed at the time of no use (at the time of non-operating state).

In addition, in order to eliminate a consumption of the aforesaid waiting electrical power, it has been proposed to provide electrical equipment in which a relay is connected to the primary power supply supplying circuit. The relay is operated under an instruction from the circuit for the control system and then the primary power supply supplying circuit can be turned OFF.

However, there was certain electrical equipment in many kinds of electrical equipment that the primary power supply supplying circuit must be turned OFF after performing a predetermined pre-processing before the primary power supply supplying circuit is turned OFF after performing a security processing and the like, so that there was a problem that the turning-OFF means of the relay means can not be used in all kinds of electrical equipment.

As the predetermined security processing before turning OFF the power supply circuit, for example, in case of the fan heater, the primary power supply supplying circuit had to be turned OFF after performing a processing for preventing an incomplete combustion generated at the time of extinguishment, or after performing a predetermined security processing such as termination of supplying fuel to the combustion part.

In addition, since the relay was sealed at its inner side by a sealing member, the relay could not be turned OFF directly in an enforced manner from outside, resulting in that when the power supply circuit of the electrical equipment produced a certain trouble and the circuit for the control system could not be controlled, the relay could not be turned OFF and a certain problem was found in view of its safety characteristic.

SUMMARY OF THE INVENTION

It is an object of the present invention to provide electrical equipment capable of solving the aforesaid problems, performing a pre-processing such as a security processing, for shutting off the power supply circuit at the electrical equipment, and concurrently setting a waiting electrical power in the primary circuit to zero.

As the first solving means for solving the aforesaid problems, the electrical equipment of the present invention is comprised of a primary power supply supplying circuit, a secondary power supply supplying circuit to which an electrical power is supplied from the primary power supply supplying circuit, a circuit for a control system connected to the secondary power supply supplying circuit, and a switch device having an ON operating member and an OFF operating member arranged at different positions from each other, wherein the switch device has a driving source connected to the primary power supply supplying circuit, automatically operating the OFF operating member so as to automatically turn OFF the switch device, supplying of an electrical power to the primary power supply supplying circuit is carried out by turning ON the switch device upon manual operation of the ON operating member, and when the supplying of an electrical power to the primary power supply supplying circuit is shut off, the circuit for the control system is operated to perform a predetermined processing, thereafter the driving source is driven, the OFF operating member is automatically operated, the switch device is automatically turned OFF, and the supplying of electrical power to the primary power supply supplying circuit is automatically shut off.

As the second solving means for solving the aforesaid problems, the switch device performs a turning-ON operation by manually moving the ON operating member in one direction and has an over-stroke region where it can be moved further in one direction also after performing this ON operation, there is provided a sensing switch for outputting ON/OFF signal by the ON operating member reciprocated and moved within the over-stroke region, and the driving source is driven under an instruction from the circuit for the control system upon elapsing of a predetermined period of time after the circuit for the control system detects either ON or OFF signal of the sensing switch.

As the third solving means for solving the aforesaid problems, the electrical equipment is comprised of a primary power supply supplying circuit, a secondary power supply supplying circuit to which an electrical power is supplied from the primary power supply supplying circuit, a circuit for a control system connected to the secondary power supply supplying circuit, and a switch device having an ON operating member and an OFF operating member arranged at different positions from each other, wherein the switch device has a solenoid connected to the primary power supply supplying circuit to enable the OFF operating member to be automatically operated and to enable the switch device to be automatically turned OFF, and when an electrical power supplied to the primary power supply supplying circuit is shut off, the solenoid is driven to enable the switch device to be automatically turned OFF, and at the same time the movable iron core arranged at the solenoid is arranged in such a way that it can be forcedly operated from outside.

As the fourth solving means for solving the aforesaid problems, the electrical equipment is constructed such that there is provided an operating panel for holding an operating button in which the ON operating member of the switch device can be operated from outside and the forced operation of the movable iron core is carried out by operating a pushing rod arranged inside the operating panel.

As the fifth solving means for solving the aforesaid problems, the electrical equipment is constructed such that the operating panel has a through hole where the movable iron core can be forcedly operated from outside.

BRIEF DESCRIPTION OF THE DRAWINGS

FIG. 12 is a view for illustrating a relation between a control system circuit and an operation of a switch device of the present invention.

DETAILED DESCRIPTION OF THE PREFERRED EMBODIMENTS

Figure 1:
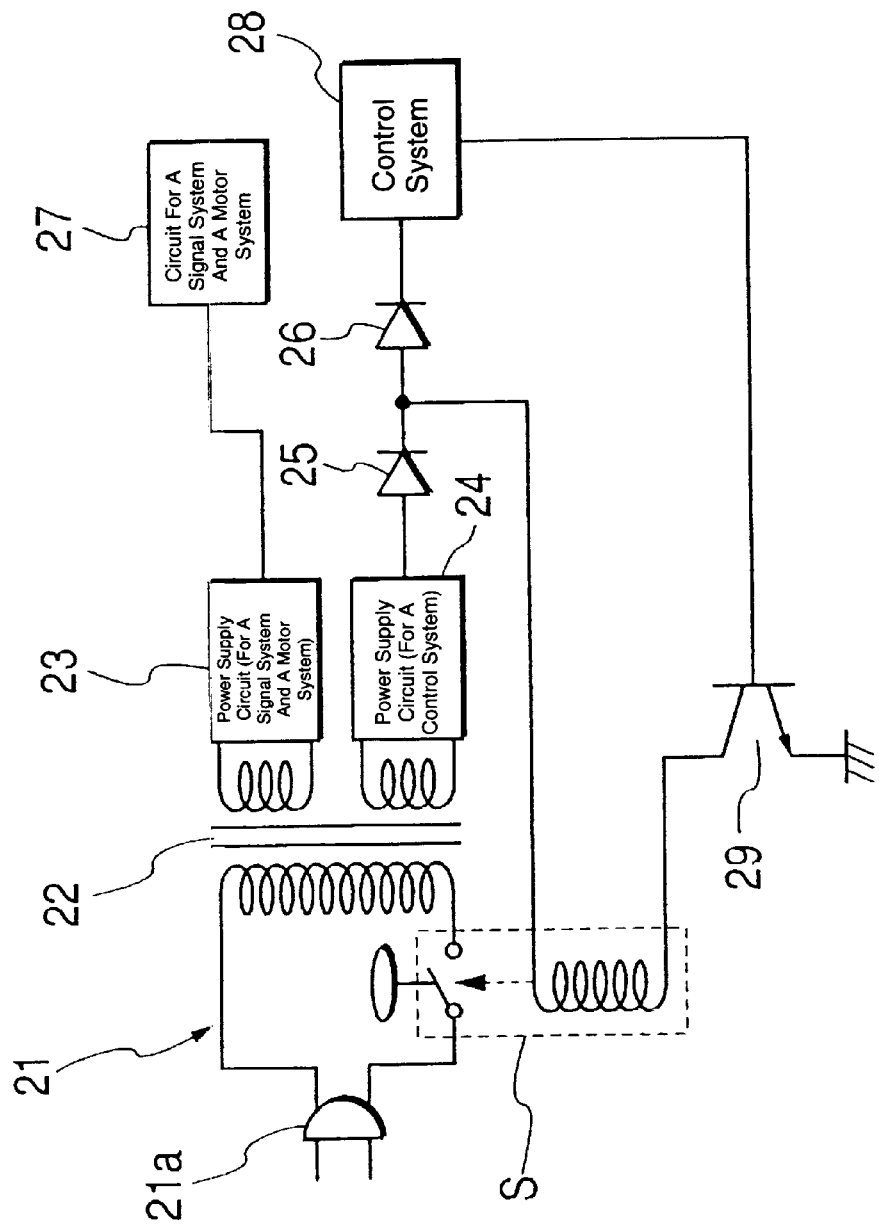
FIG. 1 is a substantial circuit diagram for showing a power supply control circuit in electrical equipment of the present invention.
Figure 2:
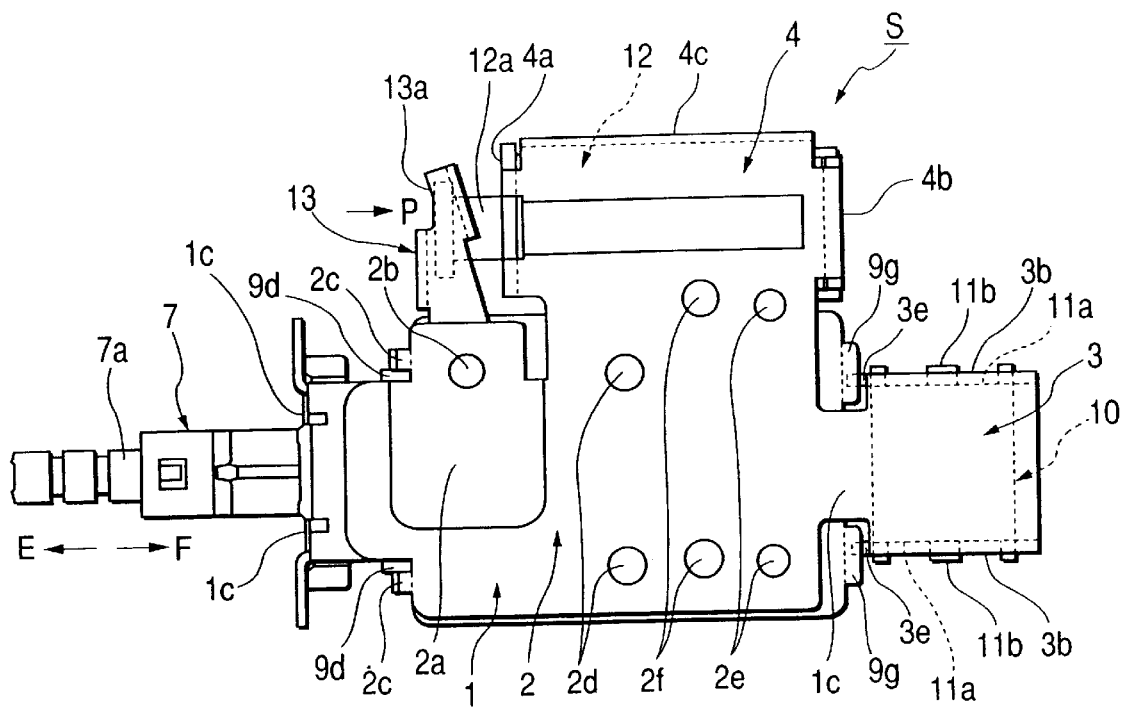
FIG. 2 is a top plan view for showing a switch device of the present invention.
Figure 3:
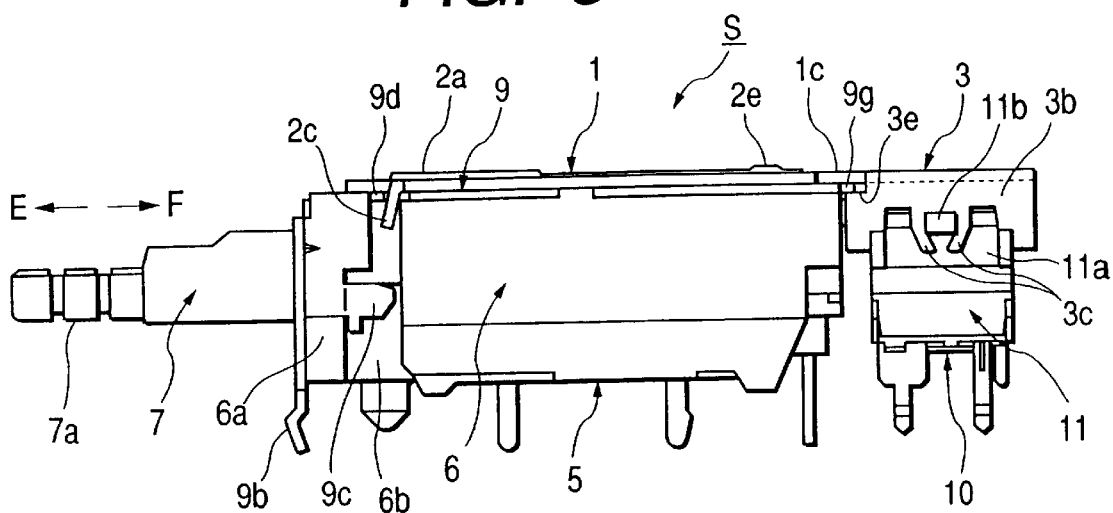
FIG. 3 is a front elevational view for showing a switch device of the present invention.
Figure 4:
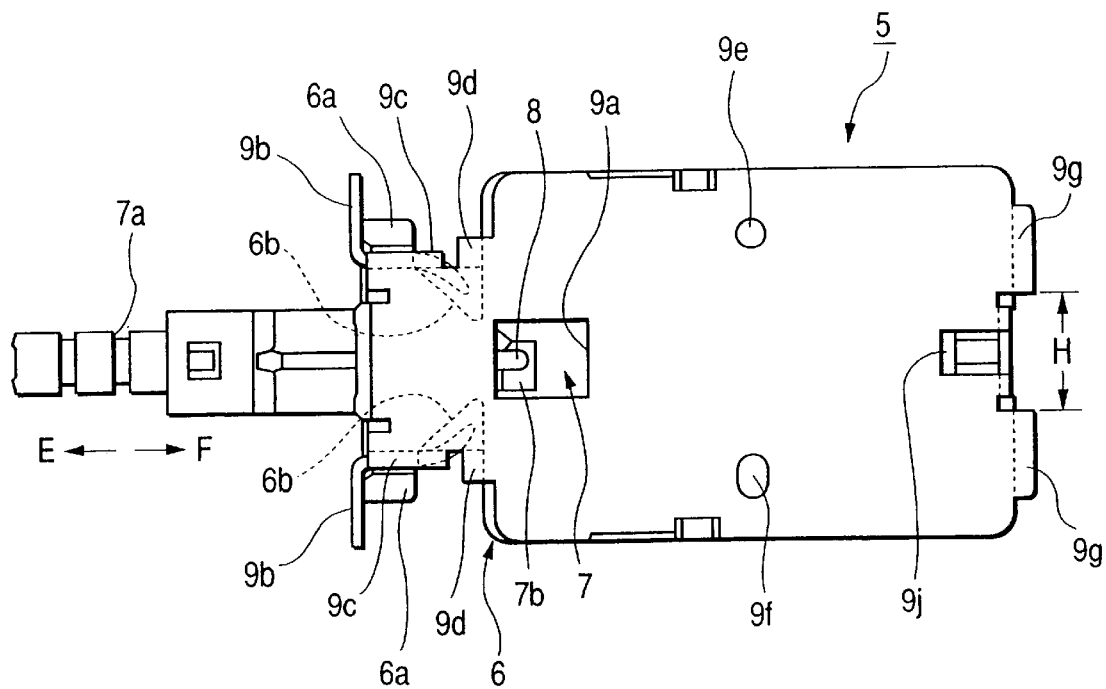
FIG. 4 is a top plan view for showing a first switch of a switch device of the present invention.
Figure 5:
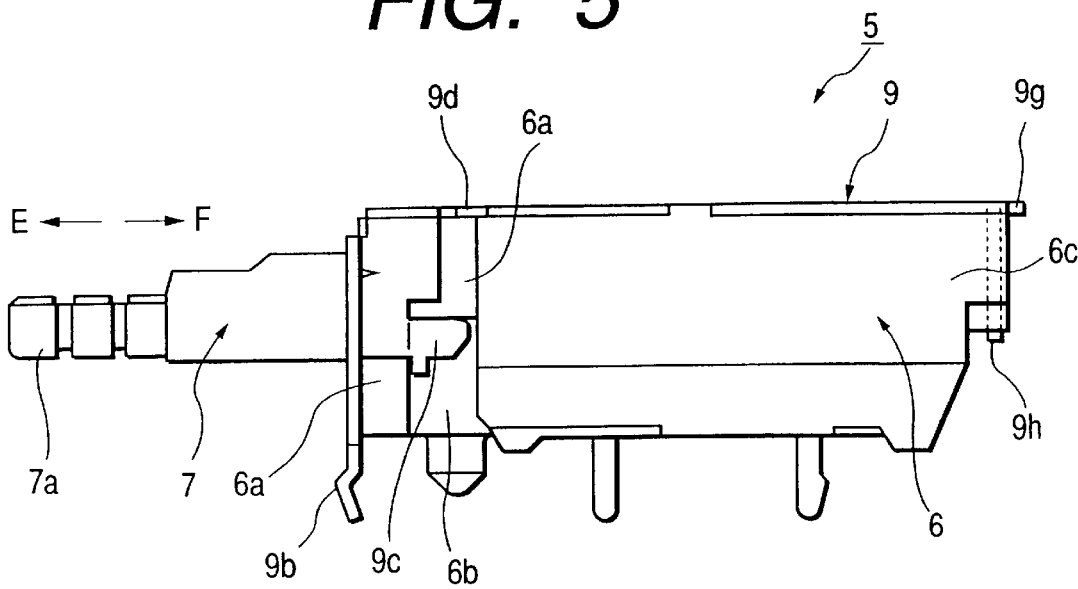
FIG. 5 is a front elevational view for showing a first switch of a switch device of the present invention.
Figure 6:
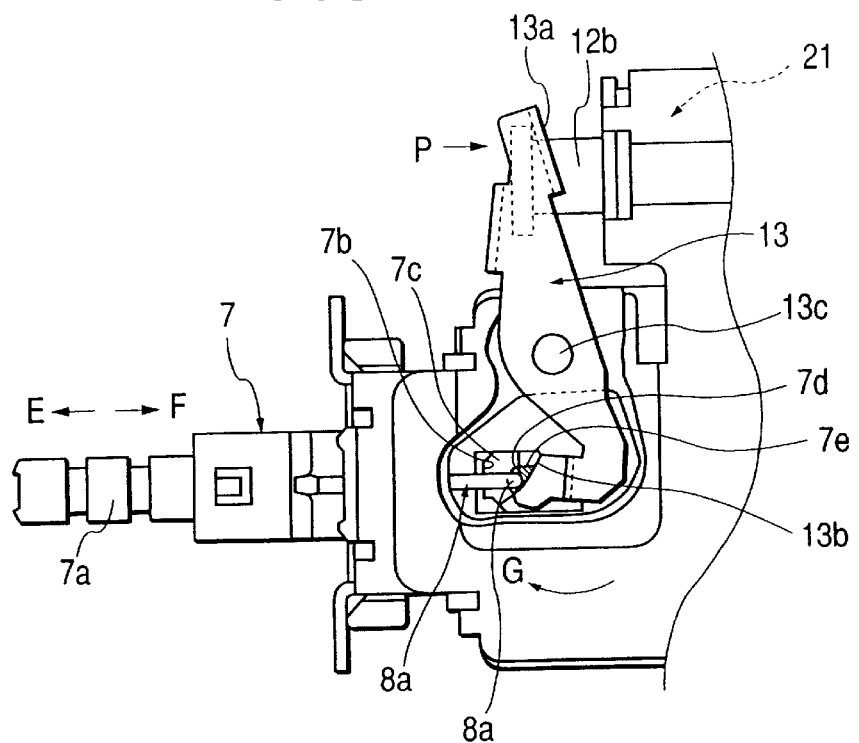
FIG. 6 is a substantial enlarged view for showing a switch device of the present invention.
Figure 7:
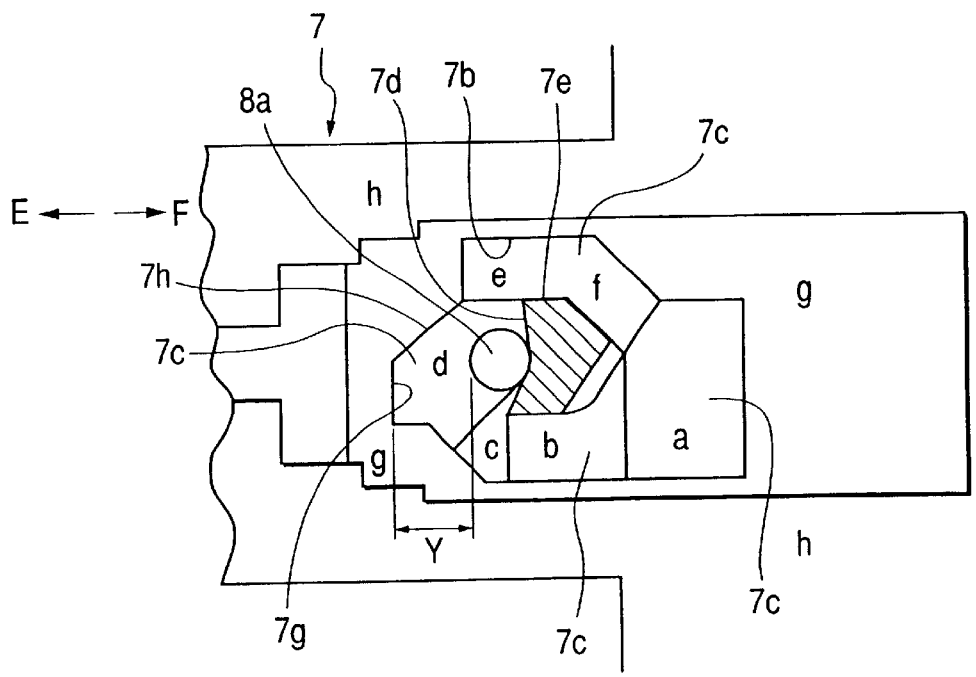
FIG. 7 is a schematic view for illustrating a cam bottom surface of a switch device of the present invention.
Figure 8:
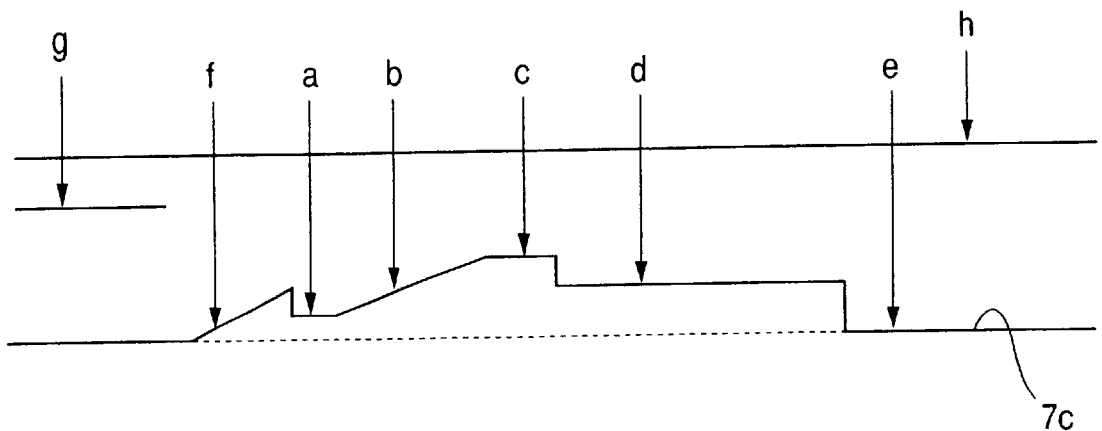
FIG. 8 is a schematic view for illustrating a cam bottom surface of a switch device of the present invention.
Figure 9:
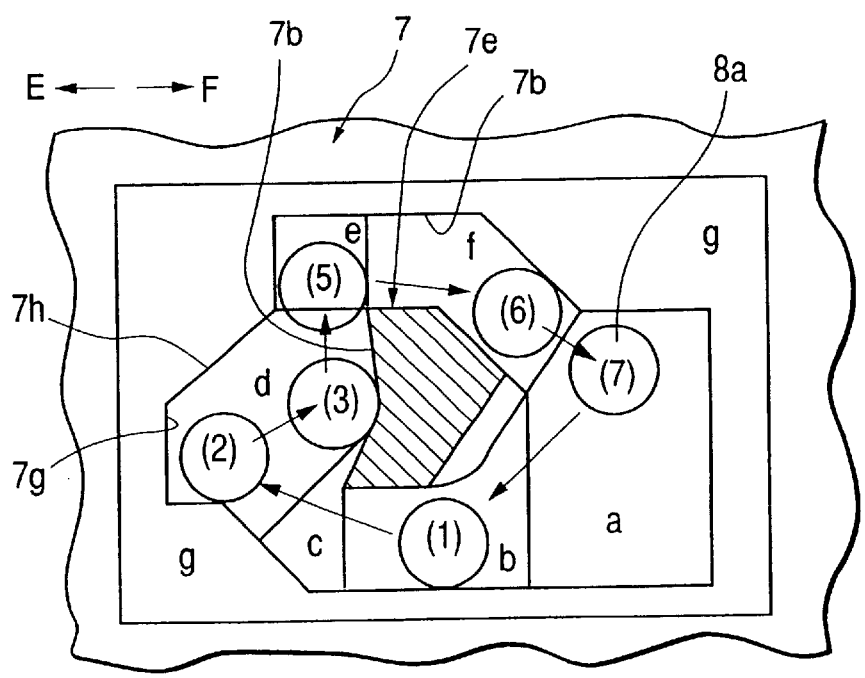
FIG. 9 is a schematic view for illustrating an action of a lock member of a switch device of the present invention.
Figure 10:
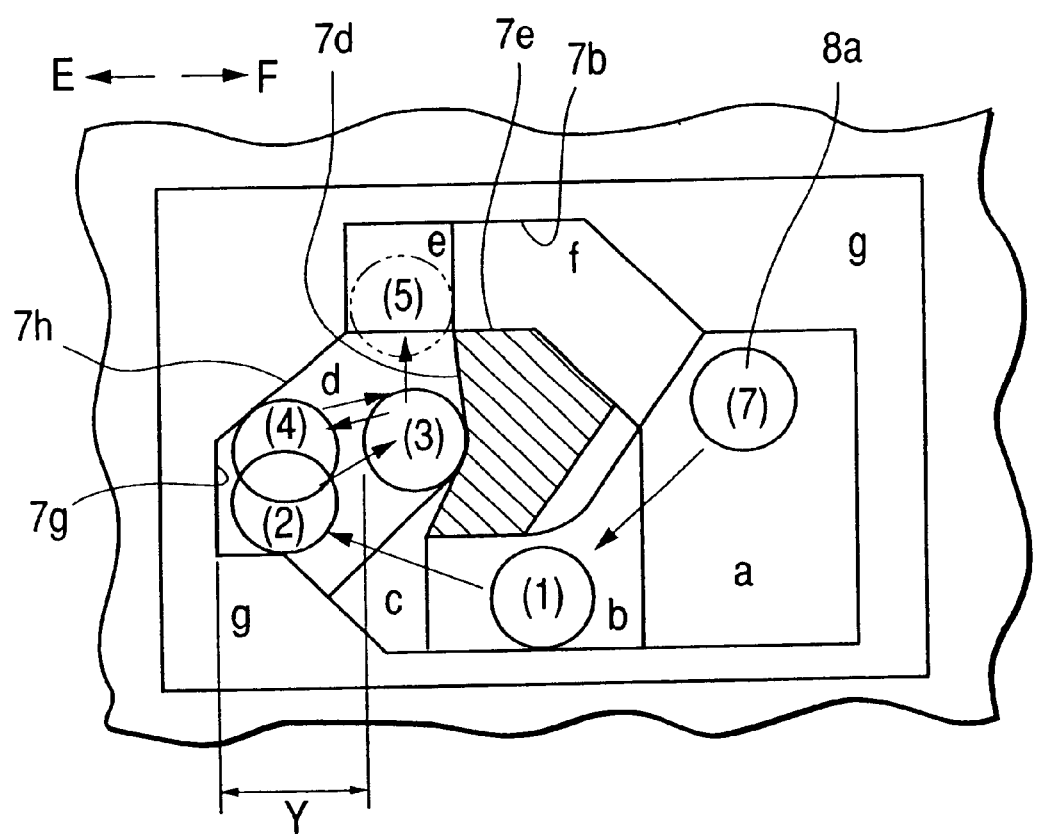
FIG. 10 is a schematic view for illustrating an-action of a lock member of a switch device of the present invention.
Figure 11:
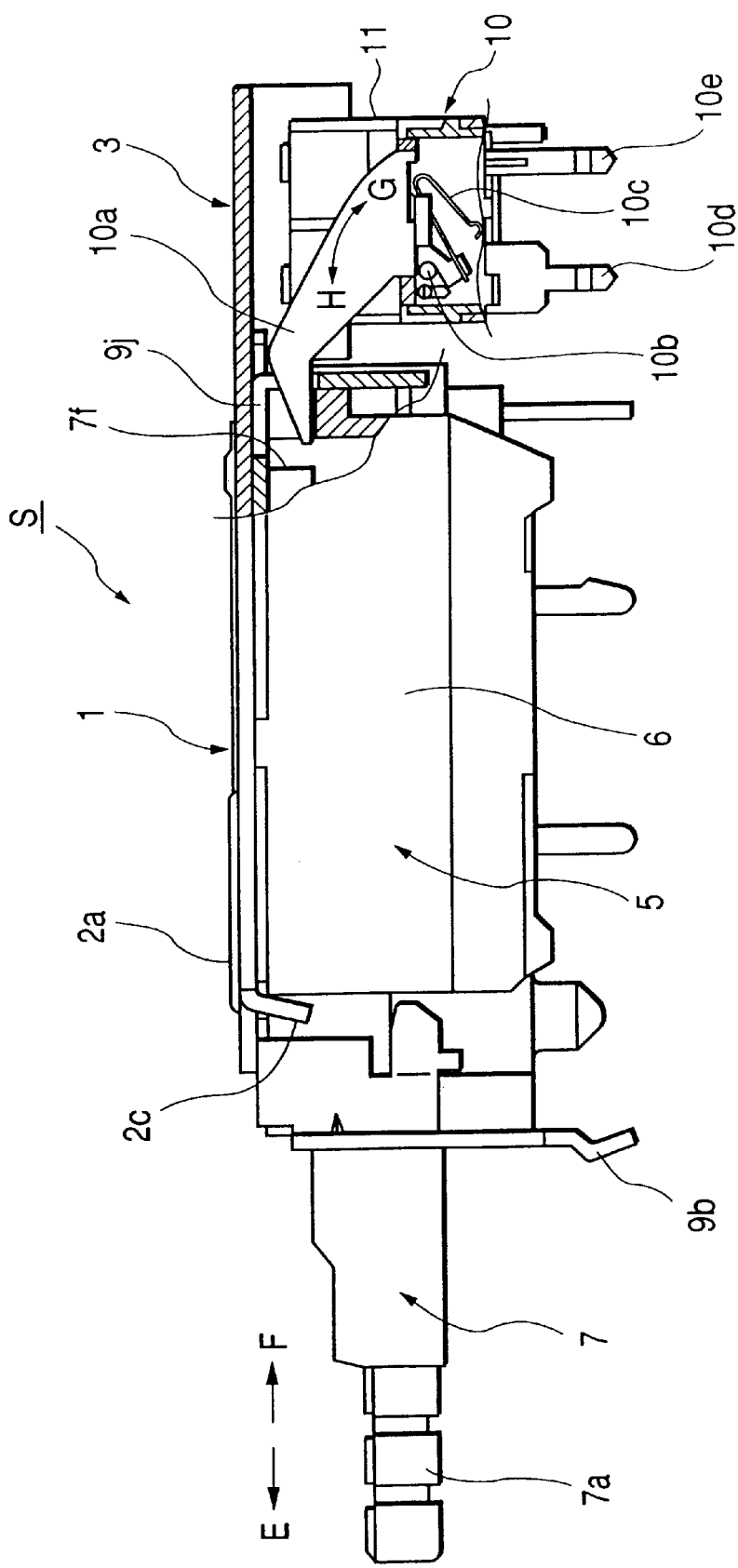
FIG. 11 is a sectional view of a substantial part for illustrating a sensing switch of a switch device of the present invention.
Figure 13A:
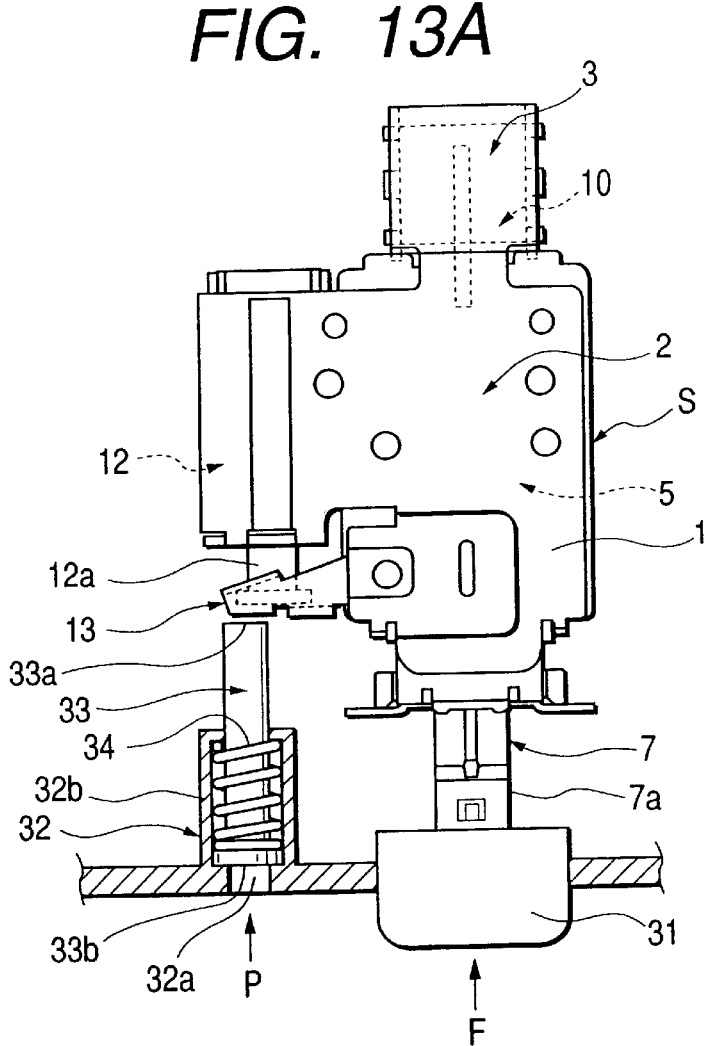
FIGS. 13A and 13B are schematic views for illustrating another preferred embodiment of the present invention.
Figure 13B:
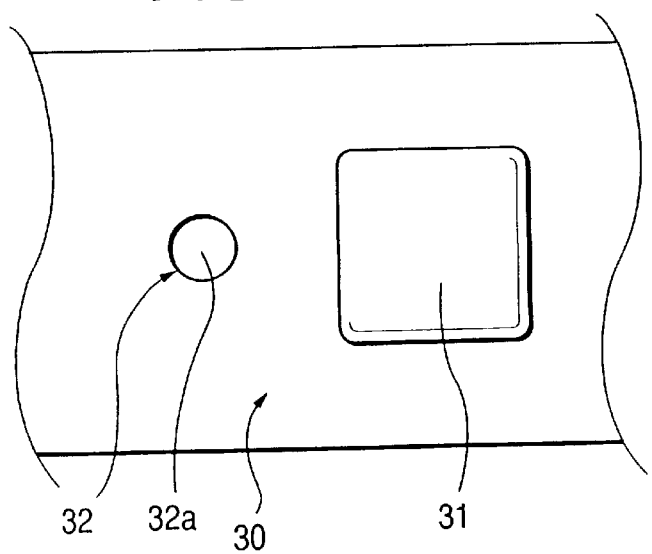

Referring now to the drawings, electrical equipment of the present invention will be described as follows. FIG. 1 is a substantial circuit diagram for showing a power supply control circuit in electrical equipment of the present invention. FIGS. 2 and 3 are a top plan view and a front elevational view for showing a switch device to be used in the circuit. FIGS. 4 and 5 are a top plan view and a front elevational view for showing a first switch of a switch device of the present invention. FIG. 6 is a substantial enlarged view for showing a switch device of the present invention. FIGS. 7 and 8 are schematic views for illustrating a cam bottom surface of a switch device of the present invention. FIGS. 9 and 10 are schematic views for illustrating an action of a lock member of a switch device of the present invention. FIG. 11 is a sectional view of a substantial part for illustrating a second switch of the present invention. FIG. 12 is a view for illustrating a relation between a control system circuit of electrical equipment and an operation of a switch device of the present invention. FIGS. 13A and 13B are schematic views for illustrating another preferred embodiment of the present invention.

The present invention can be applied to a general type of electrical equipment such as TV, VTR, a printer or a fan heater and the like and the preferred embodiment of the present invention will be described in reference to the fan heater as its example.

At first, as shown in the circuit diagram of a substantial part of FIG. 1, a power supply circuit for a fan heater (not shown) is comprised of a primary power supply supplying circuit 21 (hereinafter called as a primary circuit 21) to which AC 100V is supplied from a terminal 21a and a switch device S having an automatic OFF function connected to the primary circuit 21, wherein an electrical power supplied to the primary circuit 21 is supplied to a secondary power supply supplying circuit composed of a power supply circuit 23 for a signal system and a motor system, and a power supply circuit 24 for a control system or the like.

The power supply circuit 23 for the signal system and the motor system is connected to a circuit 27 for a signal system and a motor system. The power supply circuit 24 for a control system is connected to a control circuit 28 and a switch device Shaving a first switch 5, and a second switch 10 through inverse current prohibiting diodes 25, 26. To the control circuit 28 and the switch device S is supplied an electrical power from the power supply circuit 24 for a control system.

In addition, the control circuit 28 and the switch device S are connected through a driving transistor 29 so as to constitute substantially a power supply circuit for electrical equipment of the present invention.

Such a power supply circuit as described above is operated such that when a first switch 5 of the switch device S to be described later is manually turned ON, an electrical power of AC 100V is supplied to the primary power supply circuit. This electrical power is supplied to the power supply circuit 23 for the signal system and the motor system acting as the secondary power supply supplying circuit and the power supply circuit 24 for the control system and then the combustion part of the fan heater is ignited to perform a combustion.

In addition, when it is desired to extinguish the fan heater during its combustion work, a sensing switch 10 of the switch device S to be described later is turned ON, resulting in that this ON signal is detected by the circuit 28 for the control system and then a security processing for preventing any incomplete combustion during extinguishing operation or a predetermined security processing such as termination of supplying fuel to the combustion part and the like is carried out within a predetermined time.

After elapsing of a predetermined time upon turning ON of the sensing switch 10, a driving source 12 comprised of a solenoid of the switch device S to be described later is driven under an instruction applied from the control circuit 28, the first switch 5 is turned OFF automatically so as to shut off a supplying of an electrical power to the primary circuit 21.

Shutting-off of the supplying of electrical power to the primary circuit 21 enables an appropriate extinguishing of the fan heater during its combustion to be carried out.

In addition, the fan heater appropriately extinguished by the order described above enables a trouble such as an incomplete combustion or the like at the time of ignition to be eliminated when the combustion part is ignited again to perform a combustion there.

As shown in FIGS. 2 and 3, the switch device S connected to the primary circuit 21 of the power supply circuit of electrical equipment of the present invention is constructed such that a frame member 1 formed by a metallic plate punched and machined by a press or the like is arranged at the upper part of the device. This frame member 1 is constructed such that an AC switch part 2 to which a first switch 5 comprised of a switch for an AC circuit to be described later is fixed and a driving source fixing part 4 to which the driving source 12 comprised of a solenoid to be described later are formed to be adjacent to each other, and a DC switch part 3 to which a sensor 10 comprised of a switch for a DC circuit to be described later is arranged at the right side as viewed in the figure of the AC switch part 2, and then a connecting part 1c is formed between the AC switch part 2 and the DC switch part 3.

The AC switch part 2 is constructed such that there is provided a step part 2a partially protruded in a flat stepwise manner and then the step part 2a is provided with a protrusion 2b formed to be protruded in a downward direction.

Two tongue-like first caulking portions 2c, 2c at the front side of the AC switch part 2 are formed in a vertical orientation as viewed in the figure. The first caulking portions 2c, 2c are bent downwardly as shown in FIG. 3 and formed as shown there.

The flat-shaped AC switch part 2 at the right side as shown in the figure of the step part 2a is formed with a pair of protrusions 2d projected downwardly, a pair of protrusions 2e projected upwardly and a pair of position setting holes 2f, 2f between the pair of protrusions 2d and protrusions 2e, respectively.

The DC switch part 3 of the frame 1 is constructed such that a pair of side plates 3b, 3b shown in the figure are bent in a vertical direction and formed into a gate shape.

Each of the second tongue-like caulking portions 3c, 3c is formed at a pair of side plates 3b as shown in FIG. 3, a protrusion 11b of a second case 11 to be described later is caulked between the second caulking portions 3c, 3c so as to engage with the sensing switch 10 to be described later.

At a part where the side plate 3b and the connecting part 1c of the DC switch part 3 are crossed to each other are recessed and formed hooks 3e for use in engaging with the rear part of the first switch 5 to be described later. A size of a clearance formed between each of the hooks 3e and the lower surface of the connecting part 1c is formed to be slightly larger than a size of the plate thickness of a lid member 9 to be described later.

As shown in FIG. 2, a driving source fixing part 4 is formed such that a front side plate 4a is bent forward, a rear side plate 4b is bent rearward and a side plate 4c is bent upward as viewed in the figure.

Each of the first caulking parts 2c, 2c of the AC switch part 2, the side plates 3b, 3b of the DC switch part 3, the side plate 4a, rear side plate 4b and side plate 4c of the driving source fixing part 4 is bent below side in the same direction as shown in FIG. 3.

The first switch 5 fixed to the AC switch part 2 of the frame member 1 has a first case 6 as shown in FIGS. 4 and 5, and the first case 6 is made of resin material and its upper part is released.

The first case 6 is constructed such that a guide part 6a protruded forward is formed and a lower side as viewed in the figure of the outer side surface of the guide part 6a is formed.

The first switch 5 has an ON operating member 7 which can be slid. This ON member 7 can be slid in directions of arrows E and F, wherein it is manually moved in the direction of the arrow F to enable the first switch 5 to be turned ON and at the same time the first switch can be turned OFF automatically by driving the driving source 12 comprised of a solenoid to be described later.

The ON operating member 7 is made of resin material and has an operating shaft 7a protruded out from a front side of the first case 6. The operating shaft 7a has a resilient member (not shown) for resiliently biasing the ON operating member 7 always in a direction of an arrow E.

A part of the ON operating member 7 is formed with a cam recess 7b as shown in FIG. 6. The cam recess 7b is formed into a shape as indicated by a solid line in FIG. 7. At the bottom surface of the cam recess 7b are formed and recessed a plurality of flat surfaces a, c, d and e having different depths and a cam bottom surface 7c comprised of a slant surface b connecting the flat surfaces a–c and a slant surface f connecting the flat surfaces a–e in a predetermined depth.

As shown in FIG. 8, a depth of each of the flat surfaces a, c, d and e of the cam bottom surface 7c is set such that the flat surface e has the deepest depth, the flat surface a has the second deep depth, the flat surface d has the third deep depth and the flat surface c has the fourth depth (most shallow). In addition, a slant surface f is formed between the flat surface e and the flat surface a, and the slant surface f is formed such that a part which is in contact with the flat surface a is higher than the flat surface a. In addition, between the flat surface a and the flat surface c is connected by the slant surface b.

A flat surface g which is further shallower than the most shallow flat surface c in the cam bottom surface 7c is formed around the cam recess 7b and then a flat surface h becoming the surface of the ON operating member 7 is formed around the flat surface g.

At a substantial central part of the cam bottom surface 7c is protruded and formed a heart cam part 7e having a lock wall 7d colored in complete black as shown in FIG. 7.

A protruding height of this heart-shaped cam 7e is formed to have the same height as that of the flat surface g around the cam recess 7b.

A lock part 8a of the lock member 8 to be described later is abutted against the lock wall 7d to enable the ON operating member 7 to be engaged under its locked state.

A lock member 8 comprised of a metallic rod is arranged in the cam recess 7b. Both ends of the lock member 8 are bent at a substantial right angle, a lock part 8a is formed at one end of the lock member 8 and an oscillating fulcrum point (not shown) at the other end is supported at the first case 6 and arranged there.

Then, the ON operating member 7 is slid in the directions of arrows E, F to enable the lock part 8a to be oscillated on the cam bottom surface 7c.

Then, as the operating shaft 7a is pushed manually against a resilient force of a resilient member (not shown) in a direction of arrow F, the lock member 8 is guided at the cam bottom surface 7c and abutted against the lock wall 7d.

This lock member 8 is abutted against the lock wall 7d, resulting in that the ON operating member 7 is engaged in its locked state and its motion toward a direction of the arrow E is restricted. As this ON operating member 7 is engaged in its locked state, the first switch 5 is turned ON and then an electrical power is supplied to the primary circuit 21 of the power supply circuit shown in FIG. 1.

There is provided an over-stroke region Y ranging from one location where the ON operating member 7 is moved from its locked state in one direction of an arrow F to the other location where the lock part 8a is abutted against the side wall 7g shown in FIG. 7.

In addition, a guide wall 7h in the ON operating member 7 is formed at a part of the side wall 7g forming the cam recess 7b where the lock wall 7d is opposed.

Due to this fact, the lock member 8 during reciprocation of the ON operating member 7 within the over-stroke region Y is guided by the guide wall 7h and moved, so that it may not be escaped into the side of a flat surface e which is adjacent to the flat surface d and deeper than the depth of the flat surface d.

Due to this fact, when the ON operating member 7 is being reciprocated and moved within the over-stroke region Y, the ON operating member 7 is kept at its locked state and is not changed into unlocked state. In addition, when the ON operating member 7 is being moved within the over-stroke region Y, the first switch 5 is kept at its ON state.

Additionally, a lid member 9 comprised of a metallic plate closing a released part (not shown) formed at the first case 6 is arranged on the upper part of the first case 6. As shown in FIG. 4, the lid member 9 is formed with a rectangular opening 9a at its left side of it and then the cam recess 7b of the ON operating member 7 placed below can be seen through this opening 9a.

As shown in FIG. 5, both a pair of base board fixing portions 9b and a pair of caulking portions 9c bent downward are formed near the front part of the opening 9a. In addition, front engaging portions 9d, 9d arranged to be protruded out of the first case 6 are formed at an upper part and a lower part of the left side as viewed in the figure of the opening 9a shown in FIG. 4.

Additionally, each of a circular position setting hole 9e and an elliptical position setting hole 9f is formed to pass through the lid member 9.

Further, a pair of rear engaging parts 9g, 9g are protruded and formed at the rear side of the right side of the lid 9 as viewed in the figure with a spaced-apart size H being left therebetween. The rear engaging parts 9g, 9g are protruded by a predetermined amount from the rear side of the first case 6.

A rear caulking part 9h as shown in FIG. 5 is bent downward and formed between the rear engaging parts 9g, 9g. The lid member 9 is integrally fixed to the first case 6 by caulking the front caulking part 9c and the rear caulking part 9h to the first case 6. In addition, the lid member 9 is formed with a rectangular operating hole 9j at its rear side.

Such a first switch 5 is constructed such that the rear engaging portions 9g, 9g are engaged with an engaging part 3e of the frame member 1, the front engaging portions 9d, 9d are caulked to the first caulking portions 2c, 2c of the frame member 1 and fixed to the AC switch part 2 of the frame member 1.

In addition, to the DC switch part 3 of the frame member 1 is fixed a sensing switch 10 which can detect a reciprocating motion of the ON operating member 7 within the over-stroke region Y. This sensing switch 10 has a second case 11 made of the same resin material as that of the first case 6 and as shown in FIG. 2, protrusion parts 11b are formed to be protruded from side walls 11a of the second case 11 in a vertical direction as viewed in the figure.

Additionally, as shown in FIG. 11, the operating rod 10a inserted into the operating hole 9j of the lid member 9 is arranged to protrude out of the second case 11 in the sensing switch 10. As the ON operating member 7 is slid in a direction of the arrow F, this operating rod 10a is in resiliently contact with the rear end part 7f of the ON operating member 7 shown in FIG. 11.

As the operating rod 10a is pushed by the rear end part 7f of the ON operating member 7 under a sliding motion of the ON operating member 7 in a direction of the arrow F, the operating rod 10a is turned around a fulcrum point of a rotating fulcrum point 10b in a direction of a narrow G, a movable contact point 10c comprised of a resilient member of a phosphor bronze plate or the like is moved to the terminal 10d to cause the terminals 10d and 10e to be electrically conductive and then the sensing switch 10 is turned ON.

Then, the lock part 8a shown in FIG. 7 is abutted against the side wall 7g to cause a sliding motion of the ON operating member 7 in a direction of an arrow F to be stopped.

As the pressing force applied to the operating shaft 7a is removed and the ON operating member 7 is returned back in a direction of the arrow E, the operating rod 10a is turned in a direction of the arrow H with a resilient force of the movable contact point 10c, the movable contact point 10c is moved to the terminal 10e and then the sensing switch 10 is turned OFF.

The sensing switch 10 is fixed to the DC switch part 3 of the frame member 1 while the protrusion 11b is caulked with the second caulking parts 3c, 3c.

In addition, to the driving source fixing part 4 of the first fixing part 1a of the frame member 1 shown in FIG. 2 is fixed a driving source 12 comprised of a solenoid or the like to perform an automatic turning-OFF of the first switch 5 of the switch device S. This driving source 12 is comprised of a coil (not shown) and a movable iron core 12a, wherein the coil is held between the front side plate 4a and the rear side plate 4b of the frame member 1, restricted against its releasing and then the driving source 12 is fixed to the driving source fixing part 4.

Then, as the coil is electrically energized to become an energized state from a non-energized state of its initial state, the movable iron core 12a is retracted toward the direction of an arrow P with a predetermined retracting force.

An engagement part 13a of the OFF operating member 13 is engaged with the extreme end of the movable iron core 12a. This OFF operating member 13 has the engagement part 13a at one end thereof and a cam surface 13b at the other end thereof. A supporting hole 13c is formed between the engagement part 13a and the cam surface 13b.

Then, the OFF operating member 13 is engaged with the extreme end of the movable iron core 12b at its engagement part 13a, the supporting hole 13c is inserted to a protrusion part 2b of the frame member 1 and then the OFF operating member 13 is rotatably arranged around the supporting hole 13c to the frame member 1.

Due to this fact, when the lock member 8 is positioned at the lock wall 7d and the ON operating member 7 is kept locked, the driving source 12 is driven to cause the movable iron core 12a to be retracted in a direction of the arrow P, the OFF operating member 13 is rotated around the supporting hole 13c in a clockwise direction, the cam surface 13b removes the lock part 8a kept at its locked state from the lock wall 7d, resulting in that the locked state of the ON operating member 7 can be released automatically.

That is, the switch device S of the present invention for electrical equipment has the driving source 12 which is manually changed over to its ON state, locked at its ON state and the OFF operating member 13 is operated automatically to release this locked state to attain an automatic OFF state, and the switch device S is connected to the primary circuit 21.

Then, the electrical equipment of the present invention has a function in which the ON operating member 7 is manually operated to turn ON the switch device S when an electrical power is supplied to the primary circuit 21, and in turn, when the supplying of the electrical power to the primary circuit 21 is shut off, the electrical equipment of the present invention has an automatic turning-OFF function in which the circuit 28 for the control system is operated to perform a predetermined processing described above, thereafter the switch device S is automatically turned OFF by driving the driving source 12 and the supplying of electrical power to the primary circuit 21 is automatically shut off.

Referring now to FIGS. 9, 10 and 12, a relation among an action of the circuit 28 for the control system for the power supply circuit having the switch device S applied to the electrical equipment of the present invention, a fan heater, for example, a motion of the lock member 8 of the switch device S and an operation of the switch device S will be described as follows.

At first, at an initial state in which the ON operating member 7 is positioned at the left-most side as viewed in the figure and the first switch 5 is turned OFF, the lock part 8a is kept at a state in which it is positioned at a location (7) on the flat surface a. As the operating shaft 7a is pushed manually from this state to cause the ON operating member 7 to be moved to one side in a direction of arrow F, the lock member 8 passes from the flat surface a through the slant surface b and then this lock member 8 is guided to the flat surface c with the most shallow depth. After this operation, the lock part 8a drops from the flat surface c onto the flat surface d (the first flat surface), abuts against the side wall 7g of the cam recess 7b, is positioned at a location from (1) to (2) and then the motion of the ON operating member 7 toward a direction of the arrow F is stopped. At this time, the first switch 5 is turned ON.

In addition, when the lock member 8 is positioned at the location of (2), the sensing switch 10 is also turned ON. However, the circuit 28 for the control system for a fan heater does not detect any ON signal from the sensing switch 10 for several seconds after the first switch 5 is turned ON.

When the pushing force applied to the operating shaft 7a in a direction of the arrow F is released from this state, the ON operating member 7 is slightly returned back to the direction of the arrow E, the lock member 8 abuts against the lock wall 7d, is positioned at a location (3) and then the ON operating member 7 is kept at its locked state.

As the operating shaft 7a of the ON operating member 7 under this locked state is pushed again toward the direction of the arrow F, the ON operating member 7 moves within the over-stroke region Y, the lock member 8 is abutted against the side wall 7g of the cam recess 7b from the location (3) and is moved to the location (4). As this ON operating member 7 is moved within the over-stroke region Y and the lock member 8 is moved from the location (3) to the location (4), the ON operating member 7 turns ON the sensing switch 10.

As a signal when this sensing switch 10 is turned ON is detected by the circuit 28 for the control system, either a processing for preventing an incomplete combustion when a fan heater is extinguished under an instruction applied from the circuit 28 for the control system or a security processing of a predetermined processing such as a stopping of supplying fuel to the combustion part is carried out within a predetermined time.

After this operation, the coil in the driving source 12 is electrically energized under an instruction from the circuit 28 for the control system, the driving source 12 is driven, the lock member 8 is moved from the location (3) to the location (5) through the OFF operating member 13 and the locked state of the ON operating member 7 is released.

Then, the ON operating member 7 is moved in a direction of arrow E under an action of the resilient member not shown, the lock member 8 is positioned at the location (7) of the initial state through the locations (5) to (6) and at the same time the first switch 5 is turned OFF automatically and the switch device S is returned back automatically to its initial state.

As the first switch 5 is turned OFF automatically, supplying of an electrical power to the primary circuit 21 is shut off, supplying of an electrical power to the circuit 23 for the signal system and the motor system and the secondary circuit of the power supply circuit 24 for a signal system, resulting in that a consumption of waiting electrical power can be set to zero.

The driving source 12 in the preferred embodiment of the present invention has been described in reference to its solenoid device. However, it may also be applicable that as the driving source 12, a motor or the like is used.

In addition, the preferred embodiment of the present invention has been described such that a signal where the sensing switch 10 is turned ON is detected by the circuit 28 for the control system. However, the aforesaid signal may be a signal when the sensing switch 10 is turned OFF. That is, there may be provided a system in which the signal of either ON or OFF of the sensing switch 10 is detected by the circuit 28 for the control system.

In addition, as the preferred embodiment of the present invention, it is also possible that an operating panel of the electrical equipment is provided with a hole opposed to the driving source 12, the movable iron core 12a of the driving source 12 is operated from outside of the electrical equipment to enable the switch device S to be forcedly turned OFF, resulting in that its safety characteristic can be improved.

Another preferred embodiment of the electrical equipment of the present invention will be described in conjunction with FIGS. 13A and 13B, and as follows in reference to a fan heater, for example, wherein the fan heater (not shown) is provided with an operating panel 30 having an operating button 31 capable of operating from outside the ON operating member 7 of the switch device S fixed to a substrate board (not shown), wherein this operating button 31 is slidably held by this operating panel 30.

In this operating panel 30, a forced operation of the movable iron core 12a of the driving source 12 is carried out by operating a pushing rod 33 arranged in the operating part 32 inside the operating panel 30.

This operating part 32 is constructed such that a part of the operating panel 30 is formed with an operating hole 32a and then a hollow supporting part 32b is protruded inside the part where the operating hole 32a is formed, at an upper side shown in FIG. 13A and further inside upper electrical equipment as viewed in the figure.

The pushing rod 33 is slidably supported within the supporting part 32b and concurrently an extreme end 33a of the pushing rod 33 is kept to be protruded upward from the supporting part 32b as viewed in the figure. The pushing rod 33 is resiliently biased in a downward direction as viewed in the figure by a coil spring 34, the extreme end 33a of the pushing rod 33 is abutted against the extreme end of the movable iron core 12a of the driving source 12 of the switch device S or fixed with a slight clearance and the other end of the pushing rod 33 is positioned inside the operating hole 32a and can be seen from the operating hole 32a. Then, the pushing rod 33 is resiliently biased by the coil spring 34 in a downward direction as viewed in the figure.

Accordingly, the pushing rod 33 is not protruded out of a designed surface of the operating panel 30 and can prevent the pushing rod 33 from being erroneously pushed.

In the case that an operating rod not shown in the figure is inserted through the operating hole 32a and the pushing rod 33 is pushed in a direction of arrow P as well and also the movable iron core 12a is pushed in a direction of arrow P, the OFF operating member 13 is turned, the locked state of the ON operating member 7 is released, the ON operating member 7 is unlocked and at the same time the first switch 5 can be forcedly turned OFF.

It is also possible to inform a user that the pushing rod 33 is used for the case of emergency by applying a marking or the like to this pushing rod.

In the case of the electrical equipment in a still further preferred embodiment of the present invention, the movable iron core 12a of the driving source 12 comprised of a solenoid or the like is manually operated in a forced manner to enable the switch device S to be forcedly turned OFF even if a certain trouble such as a runaway or the like occurs in the circuit 28 for the control system due to a certain reason.

Accordingly, it is possible to perform a manual enforced extinguishing of combustion at a fan heater before the fan heater generates a problem such as a fire caused by an abnormal combustion there due to a runaway of the circuit 28 for the control system and then the fire can be prevented in advance.

The electrical equipment of the present invention is constructed such that the switch device having the ON operating member and the OFF operating member at different positions from each other is connected to the primary power supply supplying circuit, there is provided a driving source for automatically operating the OFF operating member to perform an automatic turning-OFF of the switch device, supplying of the electrical power to the primary power supply supplying circuit is carried out by manually operating the ON operating member to turn ON the switch device, and when a supplying of electrical power to the primary power supply supplying circuit is shut off, the circuit for the control system is operated to perform a predetermined processing, thereafter the switch device is automatically turned OFF by driving the driving source to cause the supplying of electrical power for the primary power supply supplying circuit to be automatically shut off, so that no erroneous manual operation is carried out and the primary circuit is not shut off and then a processing such as a predetermined security processing or the like can be carried out positively before the supplying of electrical power to the primary power supply supplying circuit is shut off.

Accordingly, in the case of the electrical equipment as well as a fan heater requiring a predetermined processing before its termination in operation, it is possible to provide electrical equipment having a high economic efficiency in which an electrical power supplied to the primary power supply supplying circuit is shut off after performing the predetermined processing and a consumption of a waiting electrical power becomes positively zero.

In addition, the switch device is constructed and operated such that the ON operating member is manually moved in one direction to perform a turning-ON operation, there is provided an over-stroke region where the ON operating member can be moved further in one direction also after this turning-ON operation, a sensing switch for outputting an ON/OFF signal under a reciprocating motion of the ON operating member within the over-stroke region is arranged, the driving source is driven under an instruction from the circuit for the control system after elapsing a predetermined time upon detection of the ON or OFF signal of the sensing switch by the circuit for the control system, so that an energization of the OFF operating member can be carried out within the over-stroke region of the ON operating member, the ON operating member and the OFF operating member arranged at different positions can be unified into one unit in view of their appearances, resulting in that it shows a high operability and an improved degree of freedom in a lay-out of the electrical equipment on the operating panel.

Additionally, the switch device is connected to the primary power supply supplying circuit, has a solenoid capable of automatically operating the OFF operating member and automatically turning OFF the switch device, and when a supplying of electrical power to the primary power supply supplying circuit is shut off, the solenoid is driven to enable the switch device to be automatically turned OFF and at the same time the movable iron core arranged at the solenoid can be forcedly operated from outside, resulting in that the switch device can be forcedly turned OFF. Accordingly, even in the case that the circuit for the control system comprised of a micro-computer shows a runaway state due to a certain irregular condition not to enable an automatic turning-OFF operation to be carried out, the movable iron core of the solenoid can be manually pushed to shut off the power supply circuit in a forced manner, a trouble such as a fire or the like can be prevented in advance and so it is possible to provide electrical equipment showing a high safety characteristic.

In addition, the ON operating member of the switch device has an operating panel for holding an operating button which can be operated from outside and the forced operation for the movable iron core is performed by operating the pushing rod arranged inside the operating panel, so that the pushing rod does not protrude out of the design surface of the operating panel and so it is possible to prevent the pushing rod from being erroneously pushed.

Further, a degree of freedom in arrangement of the switch device within the electrical equipment is improved.

Additionally, since the operating panel is provided with a through hole through which the movable iron core can be forcedly operated from outside, even in the case that the solenoid acting as the driving source can not be driven due to a certain irregular reason, the movable iron core is operated by inserting an elongated item such as a screw driver or the like, for example, through the through hole without arranging any special operating member to enable the power supply circuit to be forcedly shut off. Due to this fact, it becomes possible to provide less-expensive electrical equipment.

What is claimed is:

1. Electrical equipment comprising:
    a primary power supply supplying circuit;
    a secondary power supply supplying circuit to which an electrical power is supplied from the primary power supply supplying circuit;
    a circuit for a control system connected to the secondary power supply supplying circuit; and
    a switch device having manual operating member and an OFF operating member arranged at different positions from each other,
    wherein the switch device has a driving source connected to said primary power supply supplying circuit, and electrically operating said OFF operating member so as to turn OFF said switch device,
    wherein supplying of an electrical power to said primary power supply supplying circuit is carried out by turning ON said switch device upon manual movement of said manual operating member in one direction,
    wherein there is provided an over-stroke region where said manual operating member can be moved further in said one direction after performing the turning-ON operation, wherein there is provided a sensing switch for outputting an ON/OFF signal when said manual operating member is reciprocated and moved within said over-stroke region, and wherein, when the supplying of an electrical power to said primary power supply supplying circuit is shut off, an operation of said manual operating member does not cause said switch device to be turned OFF, but the circuit for the control system is operated in response to said ON/OFF signal of said sensing switch by motion in said over-stroke region, said driving source being driven after performing predetermined processing and said switch device is turned OFF by operating said OFF operating member.

2. Electrical equipment according to claim 1, wherein said driving source is a solenoid having a movable iron core, and when the electrical power supplied to said primary power supply supplying circuit is shut off, said solenoid is driven to enable said switch device to be turned OFF, and the movable iron core in said solenoid is arranged in such a way that it can be forcedly operated from outside.

3. Electrical equipment according to claim 2, wherein an operating panel is provided for holding an operating button in which said ON operating member of said switch device can be operated from outside and said forced operation of said movable iron core is carried out by operating a pushing rod arranged inside said operating panel.

4. Electrical equipment according to claim 3, wherein said operating panel has a through hole where said movable iron core can be forcedly operated from outside.

5. Electrical equipment according to claim 1, wherein said manual operating member further has a cam mechanism comprised of a heart-shaped cam and a lock member, and when said manual operating member is operated from its OFF position, said lock member is arranged so as to not be moved from the OFF position with the cam, and when said OFF operating member is driven by said driving source, said OFF operating member is forcedly moved on a passage where said lock member can be returned from the OFF position to the ON position within the cam.

* * * * *